(12) United States Patent
Wang et al.

(10) Patent No.: US 11,457,367 B2
(45) Date of Patent: Sep. 27, 2022

(54) ELECTRONIC APPARATUS, INFORMATION PROCESSING DEVICE, AND INFORMATION PROCESSING METHOD

(71) Applicants: Sony Corporation, Tokyo (JP); Song Wang

(72) Inventors: Song Wang, Beijing (CN); Na Li, Beijing (CN); Haowei Wang, Beijing (CN); Tao Cui, Beijing (CN); Huiling Zuo, Beijing (CN); Yuxuan Xie, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/611,226

(22) PCT Filed: Jul. 23, 2018

(86) PCT No.: PCT/CN2018/096621
§ 371 (c)(1),
(2) Date: Nov. 6, 2019

(87) PCT Pub. No.: WO2019/019964
PCT Pub. Date: Jan. 31, 2019

(65) Prior Publication Data
US 2020/0162928 A1    May 21, 2020

(30) Foreign Application Priority Data
Jul. 26, 2017    (CN) .......................... 201710618550.3

(51) Int. Cl.
*H04W 16/14*    (2009.01)
*H04W 24/10*    (2009.01)
(Continued)

(52) U.S. Cl.
CPC .......... *H04W 16/14* (2013.01); *H04W 24/10* (2013.01); *H04W 72/042* (2013.01); *H04W 74/08* (2013.01)

(58) Field of Classification Search
CPC ... H04W 16/14; H04W 24/10; H04W 72/042; H04W 74/08
See application file for complete search history.

(56) References Cited

U.S. PATENT DOCUMENTS

2010/0135259 A1    6/2010    Lee et al.
2016/0135143 A1*    5/2016    Won ...................... H04W 12/08
370/312
(Continued)

FOREIGN PATENT DOCUMENTS

CN    101483828 A    7/2009
CN    101489305 A    7/2009
(Continued)

OTHER PUBLICATIONS

International Search Report and Written Opinion dated Oct. 24, 2018 for PCT/CN2018/096621 filed on Jul. 23, 2018, 8 pages including English Translation of the International Search Report.

*Primary Examiner* — Walli Z Butt
*Assistant Examiner* — Ryan C Kavleski
(74) *Attorney, Agent, or Firm* — Xsensus, LLP

(57) ABSTRACT

Disclosed are an electronic apparatus, an information processing device, and an information processing method. According to one embodiment, an electronic device used for a base station side comprises a processing circuit. The processing circuit is configured to: perform channel detection for a target channel; broadcast, to a user equipment, a resource indication used for uplink transmission based on a (Continued)

result of the channel detection; and receive uplink transmission performed by the user equipment based on the resource indication.

20 Claims, 12 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2016/0337094 A1* | 11/2016 | Andreoli-Fang | H04W 72/14 |
| 2017/0171859 A1* | 6/2017 | Nimbalker | H04W 72/042 |
| 2018/0176945 A1* | 6/2018 | Cao | H04W 72/14 |
| 2018/0227936 A1* | 8/2018 | Yerramalli | H04L 27/2662 |
| 2019/0014595 A1* | 1/2019 | Yu | H04W 16/14 |
| 2019/0150176 A1* | 5/2019 | Pelletier | H04W 72/0453 |
| | | | 370/329 |

FOREIGN PATENT DOCUMENTS

| | | |
|---|---|---|
| CN | 105284172 A | 1/2016 |
| CN | 106788912 A | 5/2017 |
| CN | 106879070 A | 6/2017 |

* cited by examiner

ELECTRONIC APPARATUS, INFORMATION PROCESSING DEVICE, AND INFORMATION PROCESSING METHOD

CROSS-REFERENCE TO RELATED APPLICATIONS

The present application is based on PCT filing PCT/CN2018/096621, filed Jul. 23, 2018, which claims priority to CN 201710618550.3, filed Jul. 26, 2017, the entire contents of each are incorporated herein by reference.

FIELD OF THE INVENTION

The present disclosure relates generally to the field of wireless communication, and more particularly, to an electronic device, information processing apparatus and information processing method for base station side, as well as an electronic device, information processing apparatus and information processing method for user equipment side.

BACKGROUND OF THE INVENTION

In the existing Long-Term Evolution (LTE) systems, an uplink transmission (taking a buffer status report (BSR) as an example) is performed through a process similar to that as shown in FIG. 8: first, a user equipment (UE) sends a scheduling request (SR) to a base station; upon receipt of the scheduling request, the base station will send to the UE an uplink grant (UL grant), a resource indication for the UE to perform an uplink transmission; next, the UE performs BSR reporting according to the received uplink grant, with content of the BSR being a data amount in current uplink buffer of the UE, the BSR information will influence the base station as to how to formulate a scheduling policy; then, the base station makes an uplink grant based on the BSR reported by the UE; next, the UE will perform an uplink transmission according to scheduling designated by the base station through the BSR information.

SUMMARY OF THE INVENTION

However, with respect to for example an unlicensed frequency band, it is necessary to perform a carrier sensing (LBT) operation prior to a transmission, and if BSR reporting is still performed according to the above process, it is necessary to perform a LBT prior to each transmission, with its process being for example as shown in FIG. 9. At UE side, it is necessary to perform the LBT two times prior to BSR reporting, a BSR can be reported only in a case where both of the two times succeed, and a UE cannot perform BSR reporting if either of the two times fails. In this case, the latency of the UE performing uplink transmission will definitely be increased.

In addition, since a SR may be used only to indicate whether the UE has uplink data needed to be transmitted, an amount of information carried by the SR may be 1 bit. The cost of performing a LBT for the amount of information of 1 bit is large. Moreover, there is no dedicated resource for sending the SR on the unlicensed frequency band. Therefore, if it is possible to design a manner in which a SR step is omitted and a BSR is directly sent, this would be advantageous.

A brief summary of embodiments of the present invention is given below to provide a basic understanding of some aspects of the present invention. It should be understood that the summary is not an exhaustive summary of the present invention. It does not intend to define a key or important part of the present invention, nor does it intend to limit the scope of the present invention. The object of the summary is only to briefly present some concepts, which serves as a preamble of the detailed description that follows.

According to an embodiment, there is provided an electronic device for base station side, including a processing circuitry. The processing circuitry is configured to control to perform the operations of: performing a channel detection for a target channel; broadcasting a resource indication for uplink transmission to a user equipment based on a result of the channel detection; and receiving an uplink transmission performed by the user equipment based on the resource indication.

According to another embodiment, there is provided an information processing apparatus for base station side, including a transceiver device and a processing circuitry. The processing circuitry is configured to control the transceiver device to perform the operations of: performing a channel detection for a target channel; broadcasting a resource indication for uplink transmission to a user equipment based on a result of the channel detection; and receiving an uplink transmission performed by the user equipment based on the resource indication.

According to still another embodiment, there is provided an information processing method for base station side, including: a step of performing a channel detection for a target channel, a step of broadcasting a resource indication for uplink transmission to a user equipment based on a result of the channel detection, and a step of receiving an uplink transmission performed by the user equipment based on the resource indication.

According to an embodiment, there is provided an electronic device for user equipment side, including a processing circuitry. The processing circuitry is configured to control to perform the operations of: receiving a resource indication broadcasted by a base station based on a result of a channel detection for a target channel; and performing an uplink transmission based on the resource indication.

According to another embodiment, there is provided an information processing apparatus for user equipment side, including a transceiver device and a processing circuitry. The processing circuitry is configured to control the transceiver device to perform the operations of: receiving a resource indication broadcasted by a base station based on a result of a channel detection for a target channel; and performing an uplink transmission based on the resource indication.

According to still another embodiment, there is provided an information processing method for user equipment side, including: a step of receiving a resource indication broadcasted by a base station based on a result of a channel detection for a target channel, and a step of performing an uplink transmission based on the resource indication.

Through solutions of embodiments of the present disclosure, it is advantageous to reduce the number of times of carrier sensing, so as to reduce the latency of transmission.

BRIEF DESCRIPTION OF THE DRAWINGS

The present invention could be better understood with reference to the description given below in combination with the appended drawings, wherein throughout the appended drawings, identical or like reference signs are used to represent identical or like components. The appended drawings together with the detailed description below are included in the specification and form a part of the specification, and are used to further describe preferred embodiments of the present invention and explain the principles and advantages of the present invention by way of examples. In the appended drawings.

EMBODIMENTS OF THE INVENTION

Hereinafter, embodiments of the present invention will be described with reference to the appended drawings. Elements and features described in one figure or one embodiment of the present invention may be combined with elements and features described in one or more other figures or embodiments. It should be noted that, for the sake of clarity, representation and description of components and processing known to those ordinarily skilled which are irrelevant to the present invention are omitted in the appended drawings and the description.

Figure 1:
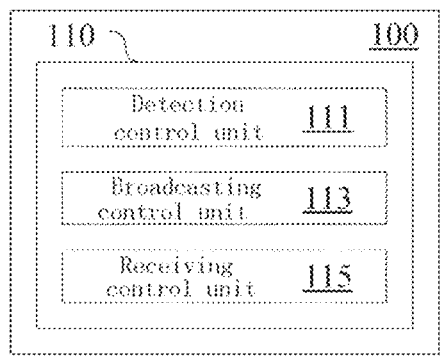
FIG. 1 is a block diagram showing a configuration example of an electronic device for base station side according to an embodiment of the present invention.

As shown in FIG. 1, an electronic device 100 for base station side according to the present embodiment includes a processing circuitry 110. The processing circuitry 110 may, for example, be realized as a specific chip, chipset or central processing unit (CPU) or the like.

The processing circuitry 110 includes a detection control unit 111, a broadcasting control unit 113 and a receiving control unit 115. It should be noted that, although the above respective units are shown in the form of functional blocks in the figure, it should be understood that the functions of the above respective units may also be realized by the processing circuitry 110 as a whole but not necessarily realized by discrete, actual components in the processing circuitry 110. In addition, although the processing circuitry 110 is shown by one frame in the figure, the electronic device 100 may include a plurality of processing circuitries, and the functions of the detection control unit 111, the broadcasting control unit 113 and the receiving control unit 115 may be distributed among the plurality of processing circuitries so as to implement these functions through cooperative operations of the plurality of processing circuitries.

The detection control unit 111 is configured to perform control to perform a channel detection for a target channel.

The target channel may for example include a channel of an unlicensed frequency band, and the channel detection may for example include a LBT.

The broadcasting control unit 113 is configured to perform control to broadcast a resource indication for uplink transmission to a user equipment based on a result of the channel detection by the detection control unit 111.

As an example, the uplink transmission may include a buffer status report (BSR). Further, the resource indication may for example include downlink control information (DCI) transmitted on a physical downlink control channel (PDCCH). However, the present invention is not limited hereto, but may include other types of uplink transmissions and resource indications.

Content contained in the resource indication may for example include the type of information to be uplink-transmitted, a clear channel assessment (CCA) time for the uplink transmission, a size of a contention window for the uplink transmission, a maximum channel occupancy time (MCOT) of the target channel, or a resource block for the uplink transmission.

Further, the resource indication may include a plurality of candidate resource blocks for the uplink transmission, and the user equipment may perform the uplink transmission using a resource block selected from the candidate resource blocks.

Figure 11:
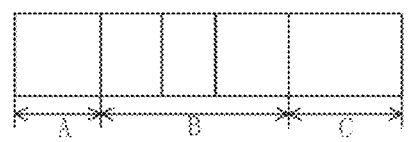
FIG. 11 is a schematic view for explaining a field structure of a broadcast message according to an exemplary embodiment of the present disclosure.

FIG. 11 shows an exemplary structure of a broadcast message, wherein the broadcast message as shown is for example a public DCI message, which can be received and demodulated by all UEs within coverage of the base station.

As shown in FIG. 11, the broadcast message may for example contain a field A, a field B and a field C. The field A may be used for informing the UE that a subframe following the broadcast message is used, for example, for BSR reporting. The field B may contain necessary parameter (s), for example including a clear channel assessment detection time (which may be 0, that is, the UE does not need to perform a CCA), a size of a contention window (which may for example be decided by the base station) and an MCOT length, and the parameter(s) in the field B are used for indicating which kind of LBT is made by the UE. The field C may contain a resource configuration scheme for transmitting a BSR, which may for example indicate which resource blocks are usable; and which resource block is specifically used by which UE may be selected by the UEs or selected through contention.

The broadcasting control unit 113 controls such that the broadcasted broadcast message can be sent on an unlicensed frequency band and can also be sent in another manner on a licensed frequency band. For example, the broadcast message may be sent in the form of a broadcast message on a licensed frequency band (e.g., through radio resource control (RRC) signaling). In addition, in a standalone (i.e., performing communication through an unlicensed frequency band without the assistance of a licensed frequency band) application scenario, it is necessary to send the broadcast message on an unlicensed frequency band.

According to an embodiment, the detection control unit 111 and the broadcasting control unit 113 are configured to perform the channel detection and the broadcasting with a predetermined period, respectively. Accordingly, a UE having an uplink transmission demand can determine an uplink transmission resource according to the periodically broadcasted message, without performing a SR.

The receiving control unit 115 is configured to perform control to receive an uplink transmission performed by the user equipment based on the resource indication.

According to an embodiment, both the broadcasting which is performed through the control by the broadcasting control unit 113 and the uplink transmission which is received through the control by the receiving control unit 115 can be performed on an unlicensed frequency band, which case corresponds to the above-mentioned standalone application scenario.

Further, according to an embodiment, the receiving which is performed through the control by the receiving control unit 115 may include: receiving uplink transmissions performed by a plurality of user equipments in time division multiplexing manner within a maximum channel occupancy time. For example, the time division multiplexing manner may include: the plurality of user equipments successively perform uplink transmissions in a contention manner.

Figure 10:
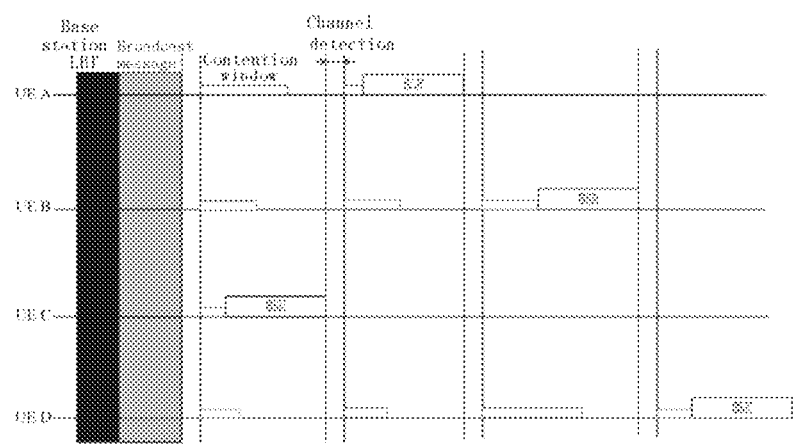
FIG. 10 is a schematic view for explaining a process of performing reporting of a BSR according to an exemplary embodiment of the present disclosure.

FIG. 10 shows an exemplary manner of the plurality of user equipments successively performing uplink transmissions (taking BSRs as an example) in a contention manner.

As shown in FIG. 10, first, the base station performs a LBT operation;

After the LBT by the base station succeeds, the base station sends a broadcast message to inform UEs having uplink demands that for example next several subframes are used for uplink transmissions, for example, used for reporting of BSRs.

Then, the UEs preempt uplink subframes through contention by using the manner of LBT, and send BSRs on the preempted uplink subframes.

More specifically, upon receipt of the broadcast message, the UEs may perform a CCA detection (a detection time of CCA may be 0), and then perform a random back-off process. Associated parameters of performing the CCA detection and the random back-off process can be obtained from broadcast information (e.g., the above-mentioned field B). In the random back-off phase, the UEs each may randomly select a value of a contention window, and then perform countdown zero clearing. A value of a largest contention window can also be obtained from broadcast information (e.g., the above-mentioned field B).

In the random back-off phase, a UE which selects a value of a contention window which is minimum will complete countdown zero clearing first, and then it will obtain a use right of the subframes, to perform reporting of a BSR.

In the example in FIG. 10, through the random back-off process, reporting of BSRs is performed successively in the sequence of UE C, UE A, UE B and UE D.

Further, the BSR information transmitted by the UEs can be added with identity identification information of the UEs, so that the base station knows which UE performs a BSR transmission on the subframes. The manner of adding the identity information of the UEs can adopt a manner similar to scrambling DCI with a radio network temporary identifier (RNTI).

Figure 12:
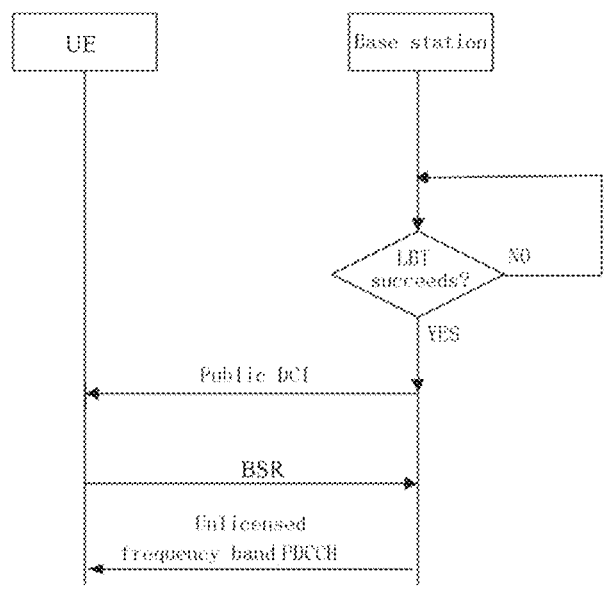
FIG. 12 is a flowchart for explaining a process of performing reporting of a BSR according to an exemplary embodiment of the present disclosure.

Next, a process of performing reporting of a BSR according to an exemplary embodiment will be explained with reference to the flowchart of FIG. 12.

First, a base station performs a LBT;

in a case where the LBT succeeds, the base station broadcasts public DCI to UE(s);

next, the UE(s) successively transmits a BSR in for example the manner of a contention window;

then, the base station makes an uplink grant based on the BSR reported by the UE(s), for example through PDCCH.

Figure 13:
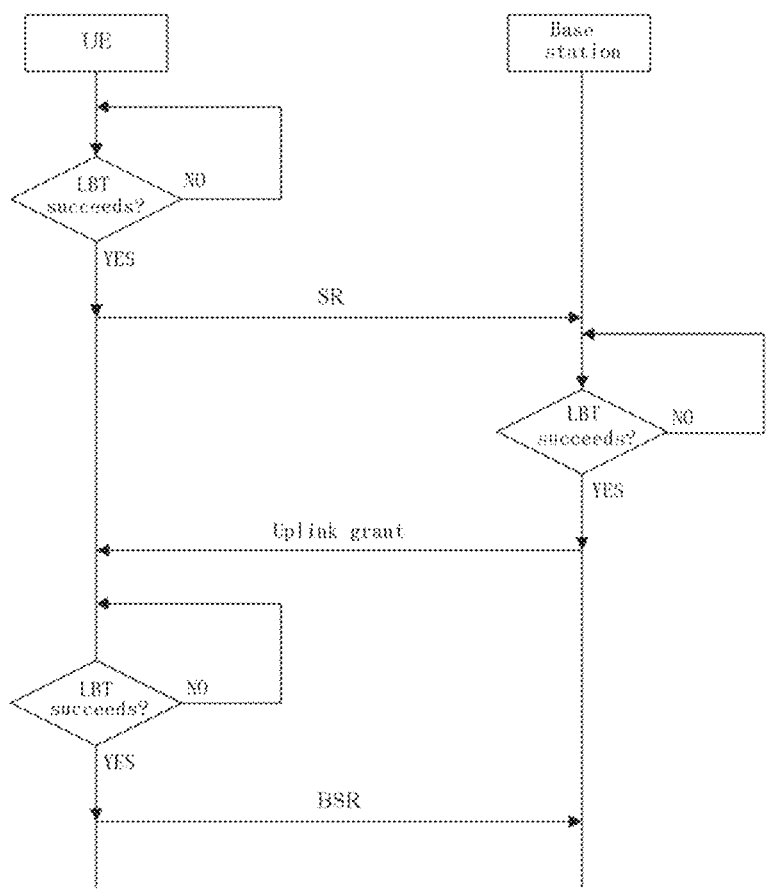
FIG. 13 is a flowchart for explaining an exemplary process of performing reporting of a BSR in the existing system.

In contrast, FIG. 13 shows an exemplary process of performing reporting of a BSR in the existing system.

First, a UE performs a LBT;

in a case where the LBT succeeds, the UE sends a SR to a base station;

next, the base station performs a LBT;

in a case where the LBT succeeds, the base station sends an uplink grant to the UE;

then, the UE again performs a LBT;

in a case where the LBT succeeds, the UE reports a BSR to the base station.

In the process as shown in FIG. 13, for only to complete BSR reporting, at least three LBTs are needed to be performed. In contrast, the process in FIG. 12 needs only one LBT.

In addition, in the exemplary embodiments of the present disclosure, the function of the public DCI message can substitute the functions of the SR and the UL grant in the existing manner, and it is unnecessary to configure a BSR through RRC because this public DCI information has been sufficient.

Accordingly, the solutions according to the embodiments of the present disclosure can significantly reduce the number of times of carrier sensing, so as to reduce the latency of transmission.

Further, according to an embodiment, the receiving which is performed through the control by the receiving control unit 115 may include receiving an uplink transmission performed by the user equipment based on a mini-slot configuration, and orthogonal frequency division multiplexing (OFDM) symbols contained by the mini-slot may be less than 7, for example but not limited to including three or four OFDM symbols.

Figure 14:
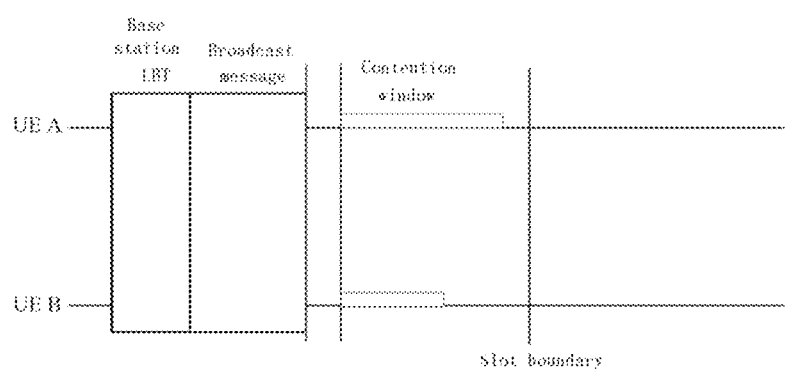
FIG. 14 is a schematic view for explaining an exemplary condition where a mini-slot is applicable.

In the exemplary manner of the plurality of user equipments successively performing uplink transmissions in a contention manner, as shown in FIG. 14, assuming that the UE A selects a larger contention window and the UE B selects a smaller contention window, if the UE B does not perform any operation before a slot boundary, it may lose a chance of occupying a channel. Therefore, for example in this case, a channel reservation signal or a mini-slot configuration may be introduced. For example, in the situation as shown in FIG. 14, although an interval between an expiration of a timer of the UE B and the slot boundary is smaller than one slot length, the UE B can perform an uplink transmission taking a mini-slot as a scheduling unit. The UEs for example can obtain an indication for mini-slot setting through public DCI.

After reporting of the BSRs by the UEs, the base station can know how many UEs have an uplink demand, and then the base station can formulate a corresponding scheduling policy to satisfy the uplink demands of these UEs.

Figure 15:
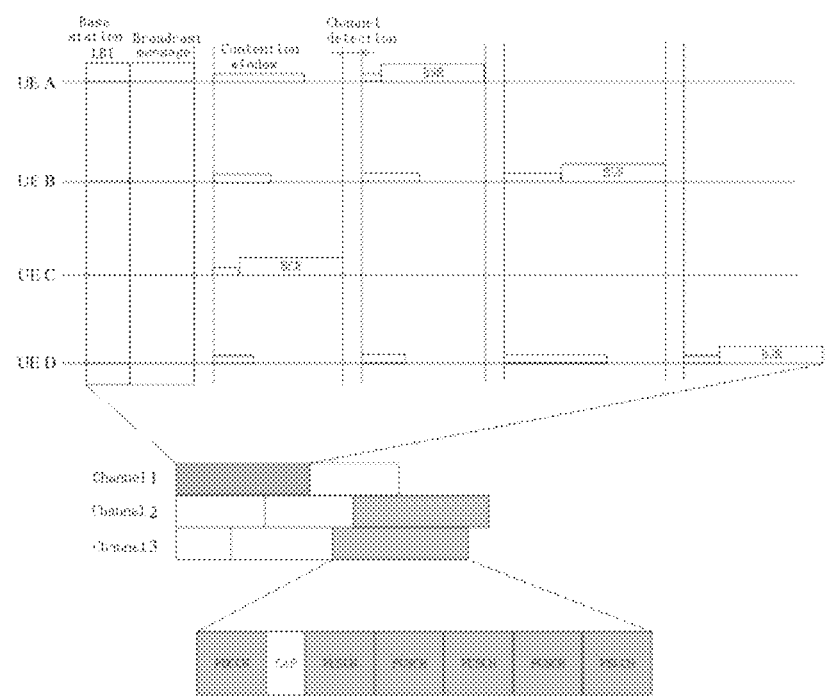
FIG. 15 is a schematic view for explaining a transmission of downlink control information.

As shown in FIG. 15, in a case where the base station has known that the UE A, the UE B, the UE C and the UE D have uplink data needed to be transmitted, the base station can distribute, in channel 2 and channel 3 which will be next occupied, DCI for giving an indication to the UE A, the UE B, the UE C and the UE D. Within MCOTs of the channel 2 and the channel 3, PDCCH can contain DCI corresponding to each UE. The UEs can perform uplink transmissions according to these DCI. Since BSRs are contained in uplink transmission PUSCH, the base station can continue to formulate DCI for a next time according to the BSR information, until the BSR information in the PUSCH of the UEs shows that there is no data in uplink buffers of the UEs.

Further, according to an embodiment, in a case where the base station detects that the target channel is idle, the base station may send a channel occupancy signal, so as to prevent the channel from being occupied by another system.

Figure 2:
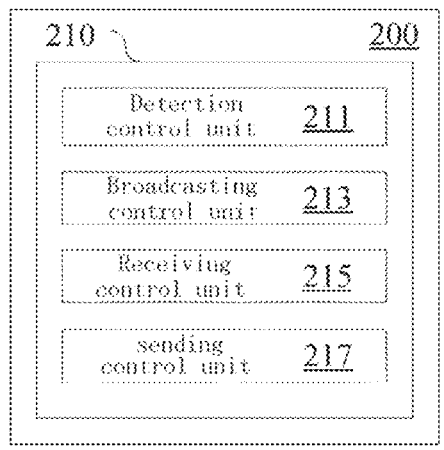
FIG. 2 is a block diagram showing a configuration example of an electronic device for base station side according to another embodiment.

As shown in FIG. 2, an electronic device 200 for base station side according to the present embodiment includes a processing circuitry 210. The processing circuitry 210 includes a detection control unit 211, a broadcasting control unit 213, a receiving control unit 215, and a sending control unit 217. Configurations of the detection control unit 211, the broadcasting control unit 213 and the receiving control unit 215 are similar to those of the detection control unit 111, the broadcasting control unit 113 and the receiving control unit 115 explained previously with reference to FIG. 1.

The sending control unit 217 is configured to, in a case where the channel detection which is performed through the control by the detection control unit 211 indicates that the target channel is idle, perform control to send a channel occupancy signal on the target channel within a maximum channel occupancy time.

In a case where a channel reservation signal is adopted, BSR information of a UE which is received by the base station may be a superimposition of the channel reservation signal and a BSR signal of the UE, while the base station is capable of easily eliminating the channel reservation signal in the superimposition. For example, if the channel reservation signal is A and the BSR signal of the UE is B, then the signal received by the base station is A+B, and the base station can obtain B through interference elimination A+B+(−A).

Further, in a case where no channel reservation signal is used, prior to sending a BSR, a value obtained by performing energy detection on the channel is for example E0, and at this time there is a possibility that the channel is preempted by another system. In a case where a channel reservation signal is used, a value obtained by performing energy detection on the channel is for example E1 (>E0), and at this time the other system detects that energy is present, and believes that the channel has been occupied, and thus will not preempt the channel. A UE served by the base station can know in advance that this E1 is a basis for detecting whether the channel is idle, and only after it is detected that an energy level exceeds E2 (>E1), it is regarded that the channel is occupied. That is, in a case where a channel reservation signal is adopted, a threshold of the channel being idle can be raised from the original E0 to a predetermined level E1. The energy levels E0, E1 and E2 can be set according to specific applications.

It should be noted that the specific details in the above example are only descriptive but not limitative.

Figure 3:
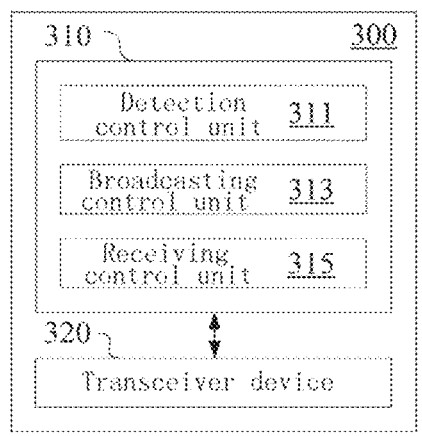
FIG. 3 is a block diagram showing a configuration example of an information processing apparatus for base station side according to an embodiment of the present invention.

FIG. 3 shows a configuration example of an information processing apparatus for base station side according to an embodiment. As shown in FIG. 3, an information processing apparatus 300 according to the present embodiment includes a processing circuitry 310 and a transceiver device 320. The processing circuitry 310 includes a detection control unit 311, a broadcasting control unit 313, and a receiving control unit 315.

The detection control unit 311 is configured to control the transceiver device 320 to perform a channel detection for a target channel.

The broadcasting control unit 313 is configured to control the transceiver device 320 to broadcast a resource indication for uplink transmission to a user equipment based on a result of the channel detection.

The receiving control unit 315 is configured to control the transceiver device 320 to receive an uplink transmission performed by the user equipment based on the resource indication.

In the foregoing description of the apparatuses and the devices according to the embodiments of the present invention, some methods and processes obviously have also been disclosed. Next, an information processing method for base station side according to an embodiment of the present invention will be described without repeating the details having been described previously.

Figure 4:
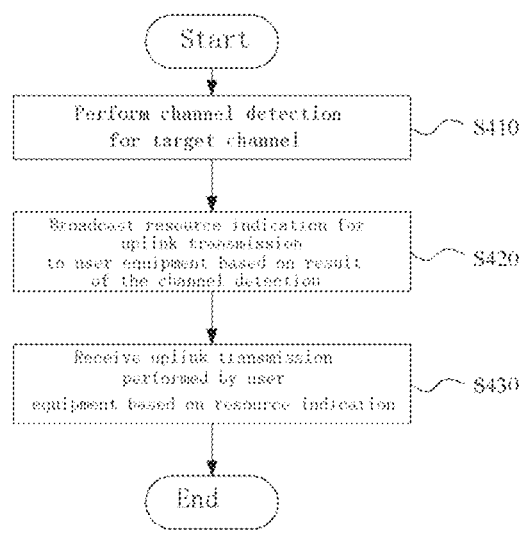
FIG. 4 is a flowchart showing a process example of an information processing method for base station side according to an embodiment of the present invention.

As shown in FIG. 4, the information processing method according to the present embodiment includes the following steps:

S410 of performing a channel detection for a target channel;

S420 of broadcasting a resource indication for uplink transmission to a user equipment based on a result of the channel detection; and S430 of receiving an uplink transmission performed by the user equipment based on the resource indication.

Further, embodiments of the present invention may also be realized at user equipment side.

Figure 5:
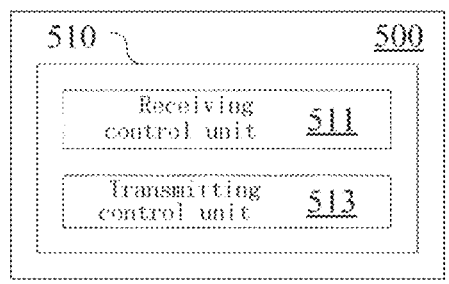
FIG. 5 is a block diagram showing a configuration example of an electronic device for user equipment side according to an embodiment of the present invention.

As shown in FIG. 5, an electronic device 500 for user equipment side according to an embodiment includes a processing circuitry 510. The processing circuitry 510 includes a receiving control unit 511 and a transmitting control unit 513.

The receiving control unit 511 is configured to control to receive a resource indication broadcasted by a base station based on a result of a channel detection for a target channel.

The transmitting control unit 513 is configured to control to perform an uplink transmission based on the resource indication.

The uplink transmission for example includes a BSR.

The transmitting control unit 513 may be configured to perform control to perform the uplink transmission in a contention manner.

The resource indication may include a plurality of candidate resource blocks for the uplink transmission, and the processing circuitry can be configured to select a resource block for the uplink transmission from the candidate resource blocks.

Figure 6:
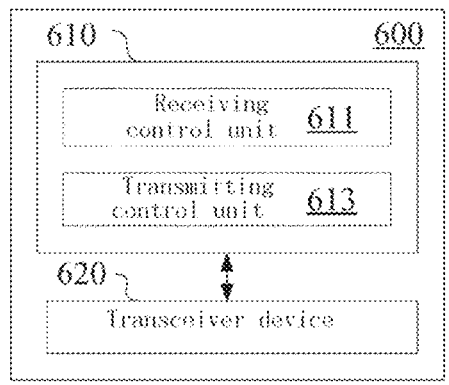
FIG. 6 is a block diagram showing a configuration example of an information processing apparatus for user equipment side according to an embodiment of the present invention.

FIG. 6 shows a configuration example of an information processing apparatus for user equipment side according to an embodiment. An information processing apparatus 600 includes a processing circuitry 610 and a transceiver device 620.

The processing circuitry 610 includes a receiving control unit 611 and a transmitting control unit 613.

The receiving control unit 611 is configured to control the transceiver device 620 to receive a resource indication broadcasted by a base station based on a result of a channel detection for a target channel.

The transmitting control unit 613 is configured to control the transceiver device 620 to perform an uplink transmission based on the resource indication.

Figure 7:
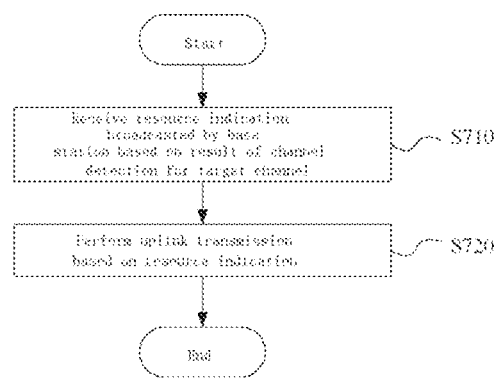
FIG. 7 is a flowchart showing a process example of an information processing method for user equipment side according to an embodiment of the present invention.
Figure 8:
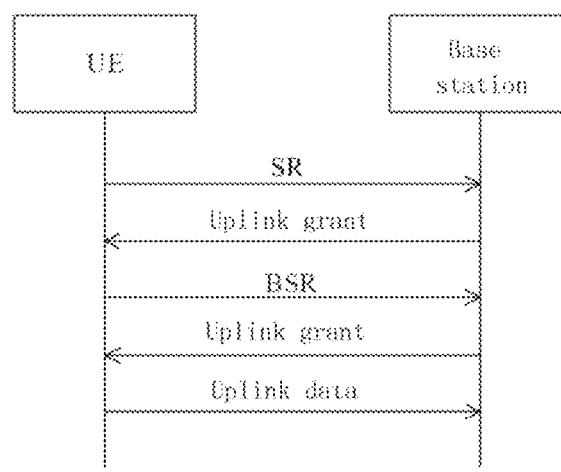
FIG. 8 is a schematic view for explaining a manner of performing exemplary reporting of a BSR in the existing system.
Figure 9:
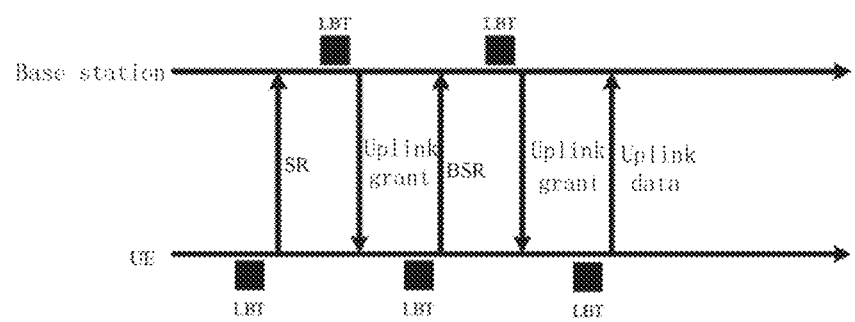
FIG. 9 is a schematic view for explaining a manner of performing exemplary reporting of a BSR in the existing system.

FIG. 7 shows an information processing method for user equipment side according to an embodiment, including:

S710 of receiving a resource indication broadcasted by a base station based on a result of a channel detection for a target channel; and S720 of performing an uplink transmission based on the resource indication.

Further, embodiments of the present invention further include:

A communication apparatus for base station side, including: a detection unit configured to perform a channel detection for a target channel; a broadcasting unit configured to broadcast a resource indication for uplink transmission to a user equipment based on a result of the channel detection; and a receiving unit configured to receive an uplink transmission performed by the user equipment based on the resource indication.

A communication apparatus for user equipment side, including: a receiving unit configured to receive a resource indication broadcasted by a base station based on a result of a channel detection for a target channel; and a transmitting unit configured to perform an uplink transmission based on the resource indication.

Figure 16:
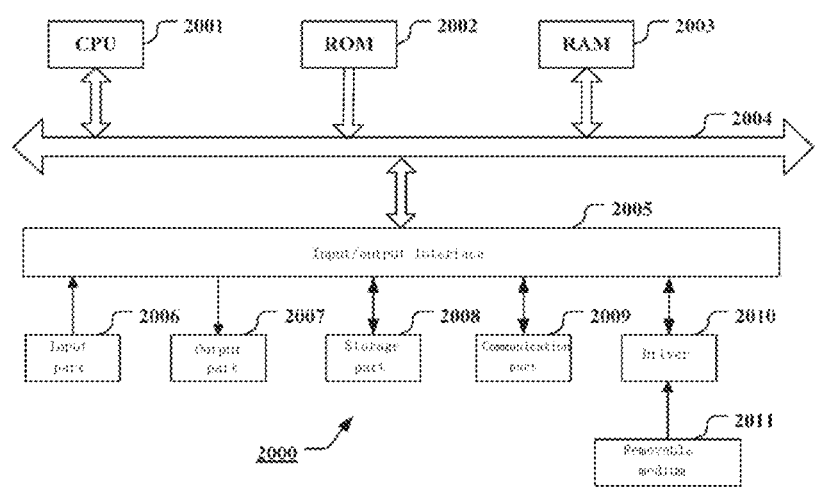
FIG. 16 is a block diagram showing an exemplary structure of a computer that realizes the methods and devices of the present disclosure.

As an example, the respective steps of the above methods and the respective constituent modules and/or units of the above devices may be implemented as software, firmware, hardware or a combination thereof. In the case of implementation by software or firmware, a program constituting the software for implementing the above methods is installed from a storage medium or a network to a computer having a purpose-specific hardware structure (e.g., the universal computer 2000 as shown in FIG. 16). The computer, when installed with various programs, is capable of executing various functions and the like.

In FIG. 16, an operation Processing Unit (i.e., CPU) 2001 executes various processing according to a program stored in a Read-Only Memory (ROM) 2002 or a program uploaded from a storage part 2008 to a Random Access Memory (RAM) 2003. In the RAM 2003, data needed when the CPU 2001 executes various processing and the like is also stored as needed. The CPU 2001, the ROM 2002 and the RAM 2003 are linked to each other via a bus 2004. An input/output interface 2005 is also linked to the bus 2004.

The following components are linked to the input/output interface 2005: an input part 2006 (including a keyboard, a mouse and the like), an output part 2007 (including a display, such as a Cathode Ray Tube (CRT), a Liquid Crystal Display (LCD) and the like, as well as a speaker and the like), the storage part 2008 (including a hard disc and the like), and a communication part 2009 (including a network interface card such as an LAN card, a modem and the like). The communication part 2009 executes communication processing via a network such as the Internet. As needed, a driver 2010 may also be linked to the input/output interface 2005. A removable medium 2011 such as a magnetic disc, an optical disc, a magnetic optical disc, a semiconductor memory and the like is installed on the driver 2010 as needed, such that a computer program read therefrom is installed in the storage part 2008 as needed.

In a case where the above series of processing is implemented by software, a program constituting the software is installed from a network such as the Internet or a storage medium such as the removable medium 2011.

Those skilled in the art should appreciate that such a storage medium is not limited to the removable medium 2011 having stored therein a program and distributed separately from an apparatus to provide the program to a user as shown in FIG. 16. Examples of the removable medium 2011 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Alternatively, the storage medium may be hard discs and the like included in the ROM 2002 and the storage part 2008, in which programs are stored, and which are distributed concurrently with the apparatus including them to users.

Embodiments of the present invention further relate to a program product having stored therein machine readable instruction codes that, when read and executed by a machine, can execute the above methods according to the embodiment of the present invention.

Accordingly, a storage medium for carrying the above program product having stored therein machine readable instruction codes is also included in the disclosure of the present invention. The storage medium includes but is not limited to a floppy disc, an optical disc, a magnetic optical disc, a memory card, a memory stick and the like.

Embodiments of the present invention further relate to an electronic apparatus. The electronic apparatus, when used for base station side, may be realized as any type of gNB, Evolved node B (eNB), such as macro eNB and small eNB. The small eNB may be an eNB of a cell with smaller coverage than a macro cell, such as a pico eNB, a micro eNB and a home (femto) eNB. Alternatively, the electronic apparatus may be realized as any other type of base station, such as NodeB and Base Transceiver Station (BTS). The electronic apparatus may include: a main body (also referred to as a base station equipment) configured to control wireless communication; and one or more Remote Radio Heads (RRHs) disposed at a different place from the main body. In addition, all the various types of terminals which will be described below can operate as base stations by temporarily or semi-persistently executing base station functions.

The electronic apparatus, when used for user equipment side, may be realized as a mobile terminal (such as a smartphone, a tablet Personal Computer (PC), a notebook PC, a portable game terminal, a portable/dongle type mobile router and a digital camera) or an in-vehicle terminal (such as an automobile navigation equipment). In addition, the electronic apparatus may be a wireless communication module (such as an integrated circuit module including a single or more dies) installed on each of the above terminals.

[Application Example with Regard to Terminal Equipment]

Figure 17:
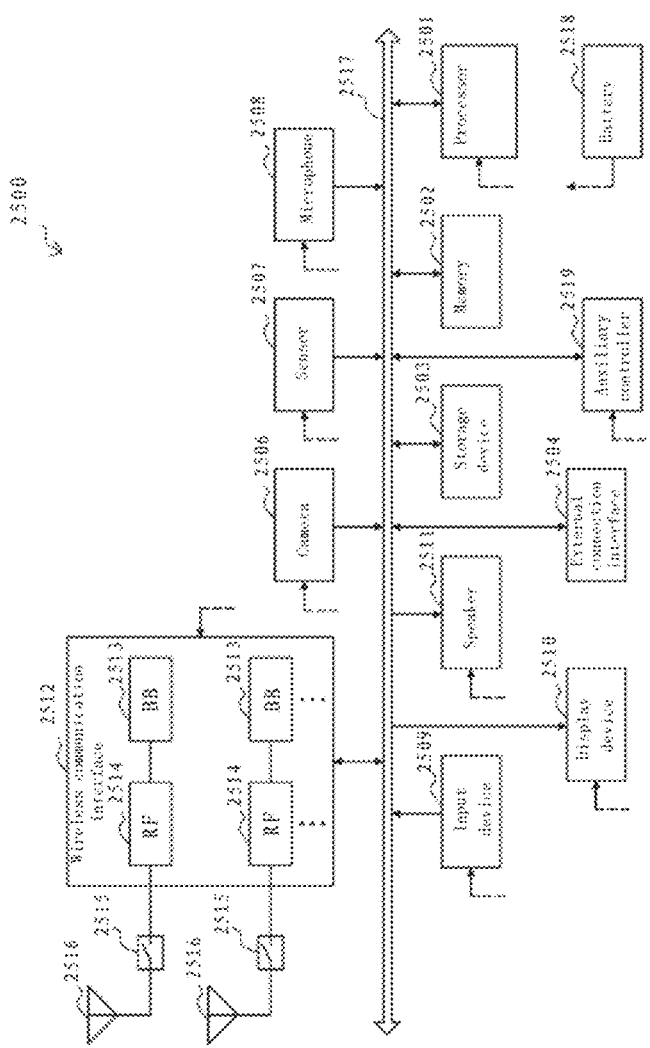
FIG. 17 is a block diagram showing an example of a schematic configuration of a smartphone to which the technology of the present disclosure may be applied.

FIG. 17 is a block diagram showing an example of a schematic configuration of a smartphone 2500 to which the technology of the present disclosure may be applied. The smartphone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a System on Chip (SoC), and control functions of an application layer and additional layers of the smartphone 2500. The memory 2502 includes an RAM and an ROM, and stores a program that is executed by the processor 2501 and data. The storage device 2503 may include a storage medium, such as a semiconductor memory and a hard disc. The external connection interface 2504 is an interface for connecting an external device (such as a memory card and a Universal Serial Bus (USB) device) to the smartphone 2500.

The camera 2506 includes an image sensor (such as a Charge Coupled Device (CCD) and a Complementary Metal Oxide Semiconductor (CMOS)), and generates a captured image. The sensor 2507 may include a group of sensors, such as a measurement sensor, a gyro sensor, a geomagnetic sensor and an acceleration sensor. The microphone 2508 converts sound inputted to the smartphone 2500 to an audio signal. The input device 2509 includes for example a touch sensor configured to detect a touch on a screen of the display device 2510, a keypad, a keyboard, buttons or switches, and receives an operation or information inputted from a user. The display device 2510 includes a screen (such as a Liquid Crystal Display (LCD) and an Organic Light-Emitting Diode (OLED) display), and displays an output image of the smartphone 2500. The speaker 2511 converts the audio signal outputted from the smartphone 2500 to sound.

The wireless communication interface 2512 supports any cellular communication scheme (such as LTE and LTE-Advanced), and executes wireless communication. The wireless communication interface 2512 generally may include for example a base band (BB) processor 2513 and a radio frequency (RF) circuit 2514. The BB processor 2513 may execute for example coding/decoding, modulation/demodulation and multiplexing/demultiplexing, and execute various types of signal processing for wireless communication. Meanwhile, the RF circuit 2514 may include for example a frequency mixer, a filter and an amplifier, and transmit and receive a wireless signal via the antennas 2516. The wireless communication interface 2512 may be a chip module on which a BB processor 2513 and an RF circuit 2514 are integrated. As shown in FIG. 17, the wireless communication interface 2512 may include a plurality of BB processors 2513 and a plurality of RF circuits 2514. Although FIG. 17 shows an example in which the wireless communication interface 2512 includes a plurality of BB processors 2513 and a plurality of RF circuits 2514, the wireless communication interface 2512 may also include a single BB processor 2513 or a single RF circuit 2514.

In addition, besides the cellular communication schemes, the wireless communication interface 2512 may support other types of wireless communication schemes, such as a short range wireless communication scheme, a near field communication scheme and a wireless Local Area Network (LAN) scheme. In this case, the wireless communication interface 2512 may include a BB processor 2513 and an RF circuit 2514 for each wireless communication scheme.

Each of the antenna switches 2515 switches connection destinations of the antennas 2516 among a plurality of circuits (for example, circuits for different wireless communication schemes) included in the wireless communication interface 2512.

Each of the antennas 2516 includes a single or more antenna elements (such as a plurality of antenna elements included in a MIMO antenna), and is used for transmitting and receiving a wireless signal by the wireless communication interface 2512. As shown in FIG. 17, the smartphone 2500 may include a plurality of antennas 2516. Although FIG. 17 shows an example in which the smartphone 2500 includes a plurality of antennas 2516, the smartphone 2500 may also include a single antenna 2516.

In addition, the smartphone 2500 may include an antenna 2516 for each wireless communication scheme. In this case, the antenna switch 2515 may be omitted from the configuration of the smartphone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512 and the auxiliary controller 2519 to each other. The battery 2518 supplies electric power to the respective blocks of the smartphone 2500 as shown in FIG. 17 via feeder lines which are partially shown as dashed lines in the figure. The auxiliary controller 2519 manipulates a minimum necessary function of the smartphone 2500, for example, in a sleep mode.

In the smartphone 2500 as shown in FIG. 17, the transceiver device or transceiver unit of the information processing apparatus at user equipment side according to the embodiment of the present invention may be realized by the wireless communication interface 2512. At least part of the functions of the processing circuitry and/or respective units of the electronic device or information processing apparatus at user equipment side according to the embodiment of the present invention may also be implemented by the processor 2501 or the auxiliary controller 2519. For example, a part of the function of the processor 2501 may be implemented by the auxiliary controller 2519 so as to reduce power consumption of the battery 2518. Further, the processor 2501 or the auxiliary controller 2519 may perform at least a part of the functions of the processing circuitry and/or respective units of the electronic device or information processing apparatus at user equipment side according to the embodiment of the present invention by executing the program stored in the memory 2501 or the storage device 2503.

[Application Example with Regard to Base Station]

Figure 18:
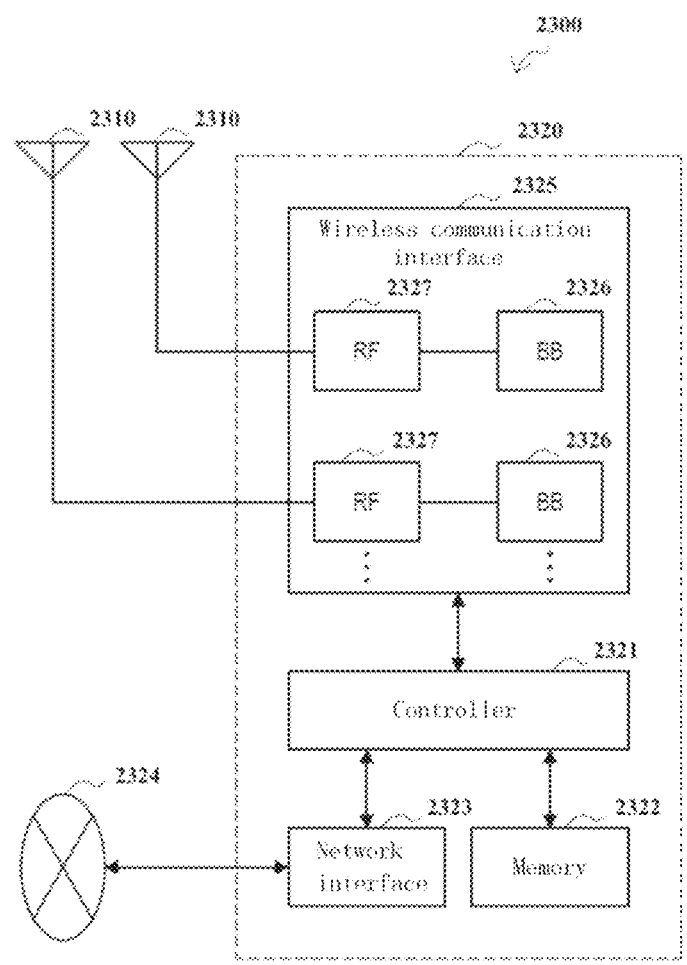
FIG. 18 is a block diagram showing an example of a schematic configuration of an eNB (Evolved Base Station) to which the technology of the present disclosure may be applied.

FIG. 18 is a block diagram showing an example of a schematic configuration of an eNB to which the technology of the present disclosure may be applied. The eNB 2300 includes one or more antennas 2310 and a base station equipment 2320. The base station equipment 2320 and each antenna 2310 may be connected with each other via a radio frequency (RF) cable.

Each of the antennas 2310 includes a single or more antenna elements (such as a plurality of antenna elements included in a multiple-input multiple-output (MIMO) antenna), and is used for sending and receiving a wireless signal by the base station equipment 2320. As shown in FIG. 18, the eNB 2300 may include a plurality of antennas 2310. For example, the plurality of antennas 2310 may be compatible with a plurality of frequency bands used by the eNB 2300. Although FIG. 18 shows an example in which the eNB 2300 includes a plurality of antennas 2310, the eNB 2300 may also include a single antenna 2310.

The base station equipment 2320 includes a controller 2321, a memory 2322, a network interface 2323, and a wireless communication interface 2325.

The controller 2321 may be for example a CPU or a DSP, and manipulate various functions of a higher layer of the base station equipment 2320. For example, the controller 2321 generates data packets according to data in a signal processed by the wireless communication interface 2325, and transfers the generated packets via the network interface 2323. The controller 2321 may bundle data from a plurality of baseband processors to generate bundled packets, and transfer the generated bundled packets. The controller 2321 may have a logic function of executing control, such as radio resource control, radio bearer control, mobility management, admission control, and scheduling. The control may be executed in combination with a nearby eNB or a core network node. The memory 2322 includes an RAM and an ROM, and stores a program that is executed by the controller 2321 and various types of control data (such as a terminal list, transmission power data, and scheduling data).

The network interface 2323 is a communication interface for connecting the base station equipment 2320 to a core network 2324. The controller 2321 may communicate with a core network node or another eNB via the network interface 2323. In that case, the eNB 2300 and the core network node or the other eNB may be connected to each other via a logic interface (such as 51 interface and X2 interface). The network interface 2323 may also be a wired communication interface, or a wireless communication interface for radio backhaul. If the network interface 2323 is a wired communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-Advanced), and provides a wireless connection to a terminal located in a cell of the eNB 2300 via the antennas 2310. The wireless communication interface 2325 generally may include for example a BB processor 2326 and an RF circuit 2327. The BB processor 2326 may execute for example coding/decoding, modulation/demodulation and multiplexing/demultiplexing, and execute various types of signal processing of a layer (for example L1, Medium Access control (MAC), Radio Link Control (RLC) and Packet Data Convergence Protocol (PDCP)). Instead of the controller 2321, the BB processor 2326 may have a part or all of the above logic functions. The BB processor 2326 may be a memory which stores a communication control program, or a module including a processor configured to execute a program and a related circuit. The function of the BB processor 2326 may be changed through program updating. The module may be a card or blade inserted in a slot of the base station equipment 2320. Alternatively, the module may also be a chip installed on the card or blade. Meanwhile, the RF circuit 2327 may include for example a frequency mixer, a filter and an amplifier, and transmit and receive a wireless signal via the antennas 2310.

As shown in FIG. 18, the wireless communication interface 2325 may include a plurality of BB processors 2326. For example, the plurality of BB processors 2326 may be compatible with a plurality of frequency bands used by the eNB 2300. As shown in FIG. 18, the wireless communication interface 2325 may include a plurality of RF circuits 2327. For example, the plurality of RF circuits 2327 may be compatible with a plurality of antenna elements. Although FIG. 18 shows an example in which the wireless communication interface 2325 includes a plurality of BB processors 2326 and a plurality of RF circuits 2327, the wireless communication interface 2325 may also include a single BB processor 2326 or a single RF circuit 2327.

In the eNB 2300 as shown in FIG. 18, the transceiver device or transceiver unit of the information processing apparatus at base station side according to the embodiment of the present invention may be realized by the wireless communication interface 2325. At least part of the functions of the processing circuitry and/or respective units of the electronic device or information processing apparatus at base station side according to the embodiment of the present invention may also be implemented by the controller 2321. For example, the controller 2321 may perform at least a part of the functions of the processing circuitry and/or respective units of the electronic device or information processing apparatus at base station side according to the embodiment of the present invention by executing a program stored in the memory 2322.

In the foregoing description of the detailed embodiments of the present invention, features described and/or shown with respect to one embodiment may be used in one or more other embodiments in an identical or similar manner, be combined with features in other embodiments, or substitute features in other embodiments.

It should be emphasized that, the term "comprising/including" used herein refers to existence of features, elements, steps or assemblies, but does not exclude existence or addition of one or more other features, elements, steps or assemblies.

In the above embodiments and examples, reference numerals composed of number are used to represent the respective steps and/or units. Those ordinarily skilled in the art should understand that, these reference numerals aim only to facilitate description and plotting, but do not represent an order thereof or any other limitation.

Further, the methods of the present invention are not limited to be executed in the temporal order described in the specification, but may also be executed sequentially in another temporal order, in parallel or independently. Therefore, the execution order of the methods described in the present specification does not limit the technical scope of the present invention.

Although the present invention has been disclosed above by the description of the detailed embodiments of the present invention, it should be understood that all the above embodiments and examples are exemplary but not limitative. Those skilled in the art could design various modifications, improvements or equivalents with regard to the present invention within the spirit and scope of the appended claims. These modifications, improvements or equivalents should also be construed as being included within the scope of protection of the present invention.

The invention claimed is:

1. An electronic device for a base station, the electronic device comprising:
 processing circuitry configured to broadcast a public downlink control information (DCI), omitting communication of a scheduling request and an uplink grant between a user equipment and the base station, by:
  performing a channel detection for a target channel; and
  broadcasting a resource indication, indicating the public DCI, for uplink transmission to the user equipment based on a result of the channel detection; and
  receiving an uplink transmission performed by the user equipment based on the resource indication, wherein
 the resource indication includes a type of information to be uplink-transmitted and a maximum channel occupancy time of the target channel.

2. The electronic device according to claim 1, wherein the uplink transmission comprises a buffer status report (BSR).

3. The electronic device according to claim 1, wherein the target channel comprises a channel of an unlicensed frequency band.

4. The electronic device according to claim 1, wherein the resource indication is transmitted on a physical downlink control channel.

5. The electronic device according to claim 1, wherein the processing circuitry is further configured to perform, in a case where the channel detection indicates that the target channel is idle, control to transmit a channel occupancy signal on the target channel within a maximum channel occupancy time.

6. The electronic device according to claim 1, wherein the receiving includes receiving uplink transmissions performed by a plurality of user equipment in a time division multiplexing manner within a maximum channel occupancy time.

7. The electronic device according to claim 6, wherein the time division multiplexing manner includes the plurality of user equipment successively performing uplink transmissions in a contention manner.

8. The electronic device according to claim 1, wherein the resource indication further comprises one or more of:
a clear channel assessment time for the uplink transmission;
a size of a contention window for the uplink transmission; and
a resource block for the uplink transmission.

9. The electronic device according to claim 1, wherein
the resource indication comprises a plurality of candidate resource blocks for the uplink transmission, and
the uplink transmission is performed by the user equipment using a resource block selected from the candidate resource blocks.

10. The electronic device according to claim 1, wherein the processing circuitry is configured to perform the channel detection and the broadcasting within a predetermined period.

11. The electronic device according to claim 1, wherein both the broadcasting and the uplink transmission are performed on an unlicensed frequency band.

12. The electronic device according to claim 1, wherein the receiving including receiving an uplink transmission performed by the user equipment based on a mini-slot configuration.

13. An information processing apparatus for base station, the information processing apparatus comprising:
a transceiver device; and
processing circuitry configured to control the transceiver device to broadcast a public downlink control information (DCI), omitting communication of a scheduling request and an uplink grant between a user equipment and the base station, by:
performing a channel detection for a target channel; and
broadcasting a resource indication, indicating the public DCI, for uplink transmission to the user equipment based on a result of the channel detection; and
receiving an uplink transmission performed by the user equipment based on the resource indication, wherein
p1 the resource indication includes a type of information to be uplink-transmitted and a maximum channel occupancy time of the target channel.

14. An information processing method for base station, the information processing method comprising:
broadcasting a public downlink control information (DCI), omitting communication of a scheduling request and an uplink grant between a user equipment and the base station, by:
performing a channel detection for a target channel; and
broadcasting a resource indication, indicating the public DCI, for uplink transmission to the user equipment based on a result of the channel detection; and
receiving an uplink transmission performed by the user equipment based on the resource indication, wherein
the resource indication includes a type of information to be uplink-transmitted and a maximum channel occupancy time of the target channel.

15. An electronic device for user equipment, the electronic device comprising:
processing circuitry configured to:
receive a resource indication, indicating a public downlink control information (DCI), broadcasted by a base station based on a result of a channel detection for a target channel, the base station having broadcast the resource indication omitting communication of a scheduling request and an uplink grant between the electronic device and the base station; and
perform an uplink transmission based on the resource indication, wherein the resource indication includes a type of information to be uplink-transmitted and a maximum channel occupancy time of the target channel.

16. The electronic device according to claim 15, wherein the uplink transmission comprises a buffer status report (BSR).

17. The electronic device according to claim 15, wherein the processing circuitry is configured to perform the uplink transmission in a contention manner.

18. The electronic device according to claim 15, wherein
the resource indication includes a plurality of candidate resource blocks for the uplink transmission, and
the processing circuitry is further configured to select a resource block for the uplink transmission from the plurality of candidate resource blocks.

19. An information processing apparatus for user equipment, the information processing apparatus comprising:
a transceiver device; and
a processing circuitry configured to:
receive a resource indication, indicating a public downlink control information (DCI), broadcasted by a base station based on a result of a channel detection for a target channel, the base station having broadcast the resource indication omitting communication of a scheduling request and an uplink grant between the electronic device and the base station; and
perform an uplink transmission based on the resource indication, wherein
the resource indication includes a type of information to be uplink-transmitted and a maximum channel occupancy time of the target channel.

20. An information processing method for user equipment, the information processing method comprising:
receiving a resource indication, indicating a public downlink control information (DCI), broadcasted by a base station based on a result of a channel detection for a target channel, the base station having broadcast the resource indication omitting communication of a scheduling request and an uplink grant between the electronic device and the base station; and performing an uplink transmission based on the resource indication, wherein the resource indication includes a type of information to be uplink-transmitted and a maximum channel occupancy time of the target channel.

* * * * *